United States Patent [19]

Yamamura et al.

[11] Patent Number: 4,610,917

[45] Date of Patent: Sep. 9, 1986

[54] INORGANIC FIBER-REINFORCED CERAMIC COMPOSITE MATERIAL

[75] Inventors: Takemi Yamamura; Masahiro Tokuse; Teruhisa Furushima, all of Ube, Japan

[73] Assignee: Ube Industries, Ltd., Yamaguchi, Japan

[21] Appl. No.: 794,300

[22] Filed: Nov. 1, 1985

[30] Foreign Application Priority Data

Nov. 6, 1984 [JP] Japan .................................. 59-232458

[51] Int. Cl.⁴ ............................................. D03D 3/00
[52] U.S. Cl. ..................................... 428/224; 428/238; 428/260; 428/284; 428/367; 428/408
[58] Field of Search ............... 51/87, 88, 96; 428/224, 428/238, 245, 260, 284, 367, 408

[56] References Cited

U.S. PATENT DOCUMENTS 4,279,654  7/1981  Yajima et al. ........................... 501/95
4,399,232  8/1983  Yajima et al. ........................... 501/95
4,556,526  12/1985 Yajima et al. ........................... 501/91

Primary Examiner—James J. Bell
Attorney, Agent, or Firm—Ladas & Parry

[57] ABSTRACT

An inorganic fiber-reinforced ceramic composite material comprising a matrix of a ceramic and inorganic fibers as a reinforcing material, characterized in that (a) the inorganic fibers are specified inorganic fibers containing silicon, either titanium or zirconium, nitrogen and oxygen, and (b) the ceramic is at least one material selected from the group consisting of carbides, nitrides, oxides, glass ceramics, graphite and specified inorganic materials containing silicon, either titanium or zirconium, nitrogen and oxygen.

8 Claims, 3 Drawing Figures

INORGANIC FIBER-REINFORCED CERAMIC COMPOSITE MATERIAL

BACKGROUND OF THE INVENTION

This invention relates to an inorganic fiber-reinforced heat-resistant ceramic composite material comprising a matrix of ceramics and inorganic fibers composed mainly of Si, either Ti or Zr, N and O as a reinforcing material.

Heat-resistant ceramics are used under severe conditions, for example at superhigh temperatures or superhigh pressures or in a corrosive environment, but have the defect of being weak to mechanical shocks and decreasing in mechanical strength or corrosion resistance at high temperatures. Attempts have been made to remedy this defect by developing cermets which are composite materials of metals and ceramics, and composite materials of ceramics with continuous filaments of fused quartz, alumina or carbon or with short fibers or whiskers of silicon carbide have been developed.

The cermets, however, cannot have sufficient high temperature strength and their service life is short because the metal component is susceptible to oxidation at high temperatures and has a lower softening temperature than the ceramic component. Furthermore, the range of their application is very much restricted. The composite materials of ceramics with continuous fibers of fused quartz or alumina, on the other hand, have the defect that the cost of production of these fibers is very high. Moreover, these composite materials have only a limited application because the fuzed quartz has a low modulus of elasticity and alumina has poor thermal shock resistance. The composite materials of ceramics with short fibers or whiskers of carbides or nitrides, such as silicon carbide, have the highest durability in a high-temperature oxidizing environment among the composite materials mentioned. But these fibers or whiskers cannot be obtained in uniform diameter, and lack homogeniety. Hence, the composite materials containing these reinforcing materials are not uniform in properties such as strength, and have low reliability in use. Furthermore, these short fibers or whiskers cannot be produced on a mass-production basis and the cost of producing composite materials of this type becomes high.

Carbon fiber composite materials which can be produced on a mass-production basis and are relatively easy to use economically still have the defect that they cannot be used in a high-temperature oxidizing environment.

Japanese Laid-Open Patent Publication No. 81309/1977 discloses the production of a heat-resistant ceramic composite material composed of a carbide or nitride ceramic as a substrate and silicon carbide fibers obtained from an organosilicon polymer as a reinforcing material. Japanese Laid-Open Patent Publications Nos. 169152/1981 and 169186/1981 dicsclose the production of a ceramic composite material composed of a glass or an aluminosilicate as a substrate and the aforesaid silicon carbide fibers as a reinforcing material.

Silicon carbide fibers obtained from these organosilicon polymers are the highest in mechanical strength such as tensile strength and modulus when the temperature at which fibers spun from these organosilicon polymers and rendered infusible are fired in an inert gas or in vacuum is 1200° C. However, when the firing temperature becomes 1300° C. or higher, the above mechanical strengths abruptly decrease. This decrease is said to be due to the fact that at a temperature of 1300° C. or higher, microcrystals of $\beta$-SiC occurs throughout the fibers and degrade them.

SUMMARY OF THE INVENTION

The present inventors extensively worked for the development of a heat-resistant composite ceramic material containing inorganic fibers which can retain a non-crystalline state even at a temperature of 1400° C. or more and show a slow decrease in mechanical strength at still higher temperatures owing to the slow formation of microcrytals. This work has led to the present invention.

It is an object of this invention to provide a novel inorganic fiber-reinforced heat-resistant ceramic composite material which gives a solution to the aforesaid problem of the prior art.

Another obJect of this invention is to provide a ceramic composite material suitable for use at super-high temperatures or superhigh pressures or in a corrosive environment.

Still another object of this invention is to provide a ceramic composite material which decreases little in strength at high temperatures and has execllent thermal shock resistance.

Yet another object of this invention is to provide a ceramic composite material having good uniformity in mechanical strength and excellent reliability.

A further object of this invention is to provide a ceramic composite material which lends itself to mass production and can be produced at reduced costs.

A still further object of this invention is to provide a ceramic composite material which is useful in various applications and has a long service life.

An additional object of this invention is to provide a ceramic composite material during the production of which the reinforcing inorganic fibers decrease little in tenacity.

According to this invention, there is provided an inorganic fiber-reinforced heat-resistant ceramic composite material comprising a matrix of ceramic and inorganic fibers as a reinforcing material, characterized in that (a) the inorganic fibers are inorganic fibers containing silicon, either titanium or zirconium, nitrogen and oxygen and being composed of
  (i) an amorphous material consisting substantially of Si, M, N and O, or
  (ii) an aggregate consisting substantially of ultrafine crystalline particles with a particle diameter of not more than 500 Å of $Si_2N_2O$, MN, $Si_3N_4$ and/or $MN_{1-x}$, and amorphous $SiO_2$ and $MO_2$, provided that in the above formulae, M represents titanium or zirconium, and x is a number represented by $0<x<1$, or
  (iii) a mixture of the amorphous material (i) and the aggregate (ii), and
(b) the ceramic is at least one material selected from the group consisting of carbides, nitrides, oxides, glass ceramics, graphite and inorganic materials containing silicon, either titanium or zirconium, nitrogen and oxygen and composed of
  (i) an amorphous material consisting substantially of Si, M, N and O, or
  (ii) an aggregate consisting substantially of ultrafine crystalline particles with a particle diameter of not more than 500 Å of $Si_2N_2O$, MN, $Si_3N_4$ and/or $Mn_{1-x}$, and amorphous $SiO_2$ and $MO_2$, provided that in the above formulae, M represents titanium or zirconium, and x is a number represented by $0<x<1$, or (iii) a mixture of the amorphous material (i) and the aggregate (ii).

DETAILED DESCRIPTION OF THE INVENTION

Figure 1:
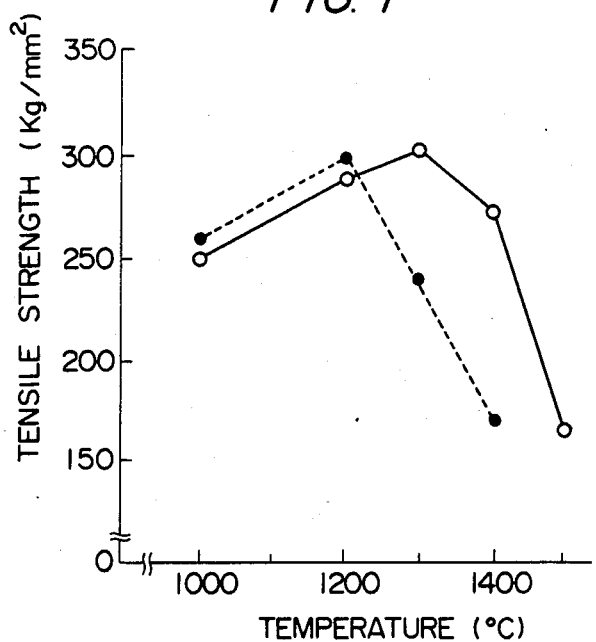
FIG. 1 shows the results of a heat resistance test on the inorganic fibers (I) (solid line) used in this invention and silicon carbide fibers (dotted line) obtained only from polycarbosilane.
Figure 2:
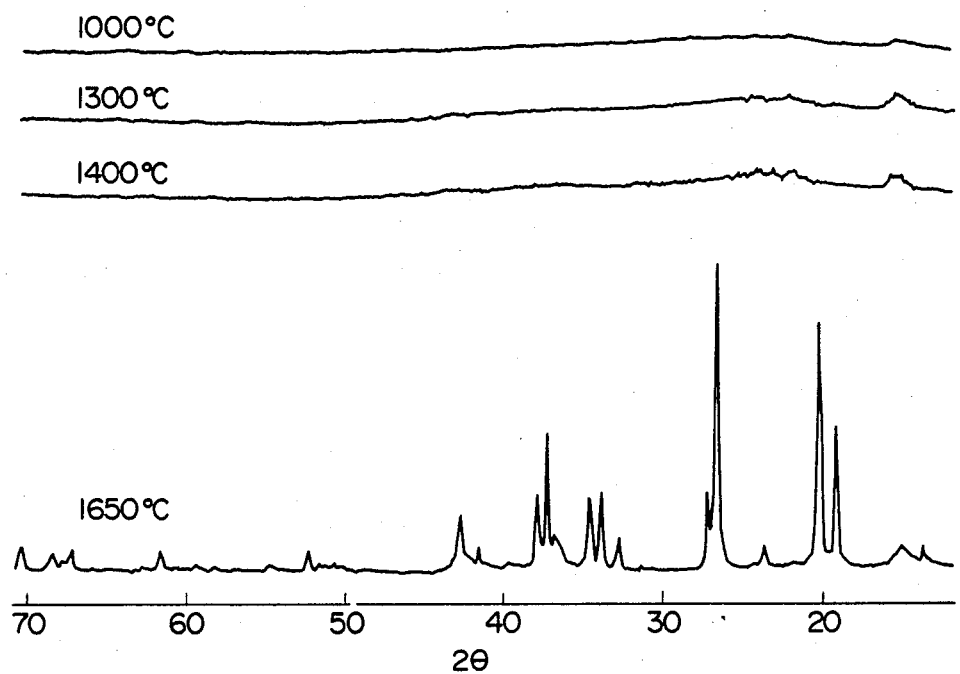
FIG. 2 shows X-ray diffraction patterns of the inorganic fibers (I) of this invention at a temperature of 1000, 1300, 1400, and 1650° C.
Figure 3:
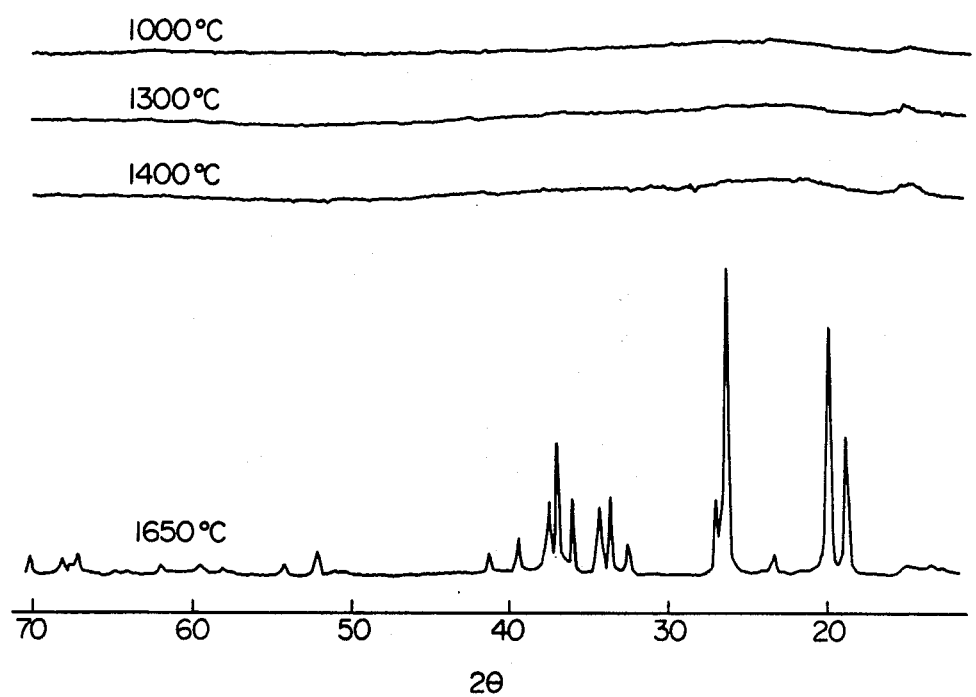
FIG. 3 shoss X-ray diffraction patterns of the inorganic fibers (II) of this invention at a temperature of 1000, 1300, 1400, and 1650° C.

Inorganic fibers consisting substantially of Si, Ti, N and O or of Si, Zr, N and O can be produced by a method which comprises:

a first step of mixing (1) a polycarbosilane having a number average molecular weight of about 500 to 10,000 and a main-chain skeleton composed mainly of structural units of the formula $Si\text{--}(CH_2)\text{--}$ in which the silicon atom substantially has two side-chain groups selected from the class consisting of hydrogen atoms, lower alkyl groups and phenyl groups with (2) a polymetallosiloxane having a number average molecular weight of about 500 to 10,000 and a main-chain skeleton composed of metalloxane units of the formula $\text{--}(M\text{--}O)\text{--}$ wherein M represents Ti or Zr and siloxane units of the formula $\text{--}(Si\text{--}O)\text{--}$, the ratio of the total number of the metalloxane units to that of the siloxane units being in the range of from 30:1 to 1:30, most of the silicon atoms of the siloxane units having 1 or 2 side-chain groups selected from the class consisting of lower alkyl and phenyl groups and most of the metal atoms of the metalloxane units having 1 or 2 lower alkoxy groups as side-chain groups, in such a mixing ratio that the ratio of the total number of the $\text{--}(Si\text{--}CH_2)\text{--}$ structural units of the polycarbosilane to the total number of the $\text{--}(M\text{--}O)\text{--}$ units and the $\text{--}(M\text{--}O)\text{--}$ units and the $\text{--}(Si\text{--}O)\text{--}$ units is in the range of from 100:1 to 1:100, and heating the resulting mixture in an organic solvent in an atmosphere inert to the reaction to bond at least some of the silicon atoms of the polycarbosilane to at least some of the silicon atoms and/or metal atoms of the polymetallosiloxane through oxygen atoms and thereby form an organic metal polymer having a number average molecular weight of about 1000 to 50,000 and composed of a crosslinked polycarbosilane moiety and polymetallosiloxane moiety;

a second step of preparing a spinning dope of the resulting polymer and spinning it;

a third step of rendering the spun fibers infusible under tension or under no tension; and a fourth step of calcining the infusible fibers in an atmosphere of an ammonia gas at a temperature in the range of 800° to 1650° C.

Alternatively, the inorganic fibers consisting substantially of Si, Ti, N and O or of Si, Zr, N and O can be produced by a process which comprises:

a first step of mixing a polycarbosilane having a number average molecular weight of 200 to 10,000 and mainly containing a main-chain skeleton represented by the general formula

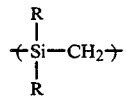

wherein
R represents a hydrogen atom, a lower alkyl group or a phenyl group,
and an organic metal compound represented by the general formula $MX_4$ wherein
M represents Ti or Zr and X represents an alkoxy group containing 1 to 20 carbon atoms, a phenoxy group, or an acetylacetoxy group,
in such mixing ratios that the ratio of the total number of the structural units of the formula $\text{--}(Si\text{--}CH_2)\text{--}$ to the total number of the structural units of the formula $\text{--}(M\text{--}O)\text{--}$ of the organic metal compound is in the range of from 2:1 to 200:1, and reacting the mixture under heat in an atmosphere inert to the reaction to bond at least some of the silicon atoms of the polycarbosilane to the metal atoms of the organic metal compound through oxygen atoms and form an organic metallic polymer having a number average molecular weight of about 700 to 100,000;

a second step of preparing a spinning dope of the organic metal polymer and spinning it;

a third step of rendering the spun fibers insoluble under tension or under no tension; and a fourth step of calcining the infusible fibers at a temperature of 800° to 1650° C. in an atmosphere of an ammonia gas.

As compared with silicon carbide fibers, the inorganic fibers containing Ti or Zr have the action of inhibiting the formation of β-SiC crystallites which cause fiber degradation at high temperatures.

The inorganic fibers contain 30 to 60% by weight of Si, 0.5 to 35% by weight, preferably 1 to 10% by weight, of Ti or Zr, 10 to 40% by weight of N, and 0.01 to 30% by weight of O in terms of elemental composition.

The inorganic fibers may be used in various forms, for example in the form of a blend of these fibers arranged monoaxially or multiaxially, a fabric of the plain, satin, imitation gauze, twill or leno weave, a helically woven fabric, a three-dimensionally woven fabric, or chopped fibers.

It is also possible to use precursor fibers (non-calcined) which are obtained in a pre-step of producing the inorganic fibers in accordance with this invention, namely a fibrous material obtained by spinning an organic metallic polymer having a number average molecular weight of 700 to 100,000, preferably 1,000 to 50,000.

Examples of the carbide ceramics that can be used in this invention include silicon carbide, titanium carbide, zirconium carbide, vanadium carbide, niobium carbide, tantalum carbide, boron carbide, chromium carbide, tungsten carbide and molybdenum carbide. Examples of the nitride ceramics include silicon nitride, titanium nitride, zirconium nitride, vanadium nitride, niobium nitride, tantalum nitride, boron nitride, aluminum nitride and hafnium nitride. Examples of the oxide ceramics are alumina, silica, magnesia, mullite and cordierite. Examples of the glass ceramics are borosilicate glass, high silica glass, and aluminosilicate glass. Graphite may be amorphous or crystalline. Other examples of the ceramics include inorganic materials containing silicon, either titanium or zirconium, nitrogen and oxygen and composed of (i) an amorphous material consisting substantially of Si, M, N and O, or (ii) an aggregate consisting substantially of ultrafine crystalline particles with a particle diameter of not more than 500 Å of $Si_2N_2O$, MN, $Si_3N_4$ and/or $MN_{1-x}$, and amorphous $SiO_2$ and $MO_2$, provided that in the above formulae, M represents titanium or zirconium, and x is a number represented by $0<x<1$, or (iii) a mixture of the amorphous material (i) and the aggregate (ii).

The increase adhesion to the inorganic fibers, the ceramics are used advantageously in the form of as fine particles as possible having a maximum particle diameter of 300 micrometers.

The preferred mixing proportion of the inorganic fibers or the fibrous organic metallic polymer in accordance with this invention is 10 to 70% by volume, especially 20 to 60% by volume.

As required, binders may be added at the time of producing the composite material of this invention. One type of binder is for sintering the powdery ceramic matrix in high density, and another type of binder is for increasing the adhesion of the powdery ceramic matrix to the inorganic fibers. Ordinary binders used in sintering carbides, nitrides, oxides, and glass ceramics may be used as the first-mentioned type. For example, aluminum oxide, magnesium oxide, yttrium oxide and aluminium nitride may be used as the binders for silicon nitride. Examples of suitable binders of the other type include organic silicon polymers such as diphenylsiloxane, dimethylsiloxane, polyborodiphenylsiloxane, polyborodimethylsiloxane, polycarbosilane, polydimethylsilazane, polytitanocarbosilane and polyzirconocarbosilane, and organic silicon compounds such as diphenylsilane diol and hexamethyldisilazane.

The binder for increasing the adhesion of the powdery ceramic matrix to the inorganic fibers is converted mainly to SiC or $Si_3N_4$ upon heating, which then reacts on the surface of the powdery ceramic matrix to form a new carbide, nitride or oxide. This leads to the very good adhesion of the ceramic matrix to the inorganic fibers. Furthermore, these organic silicon compounds and organic silicon polymers also serve to increase the sinterability of the powdery ceramic matrix as do the first-mentioned ordinary binders. The addition of these binders, therefore, is very advantageous to the production of composite materials having high density and strength. The addition of binders is not necessary where firm adhesion between the powdery ceramic matrix and the inorganic fibers can be achieved. The amount of the binders described above is one sufficient to obtain the intended effect, usually 0.5 to 20% by weight based on the powdery ceramic matrix.

The inorganic fiber-reinforced heat-resistant ceramic composite material of this invention can be produced by the following methods.

An assembly of the powdery ceramic matrix and the inorganic fibers may be obtained by various methods, including, for example, a method which comprises embedding the fibers in the powdery ceramic matrix or a mixture of the ceramics and a binder; a method which comprises arranging the fibers and the powdery ceramic matrix or a mixture of the ceramics and a binder alternately, or a method which comprises arranging the inorganic fibres, and filling the interstices of the fibers with the powdery ceramic matrix or the aforesaid mixture of the ceramic matrix. These methods permit relatively easy formation of the assembly, and can be used in the present invention. The assembly can then be sintered, for example, by a method which comprises compression-molding the assembly under a pressure of 50 to 5,000 kg/cm² using a rubber press, a die press, etc., and then sintering the molded assembly in a heating furnace at 800° to 2,400° C., or a method which comprises subjecting the assembly to hot-press sintering at a temperature of 800° to 2,400° C. while it is placed under a pressure of 50 to 5,000 kg/cm². The sintering may be carried out in vacuum or in an atmosphere of at least one inert gas such as nitrogen, argon, carbon monoxide and hydrogen.

The resulting sintered composite material can be converted to a sintered body of a higher density by subjecting it at least once to a series of treatments comprising immersing the sintered body in a solution of an organic silicon compound or an organic silicon polymer in an organic solvent under reduced pressure to impregnate the solution into the grain boundaries and pores of the sintered body, and heating the impregnated sintered body. The impregnated organic silicon compound or organic silicon polymer is converted mainly to SiC or $Si_3N_4$ upon heating. Such a material exists in the grain boundaries and pores of the composite sintered body to reduce the number of the pores and form a firm bond in the ceramic matrix. Hence, the mechanical strength of the sintered composite material is increased.

The mechanical strength of the sintered composite can also be increased by coating the organic silicon compound or polymer either as such or as required, as a solution in an organic solvent to close the open pores or perform surface coating.

The organic solvent used as required is one which dissolves the aforesaid silicon compound or polymer. Examples are benzene, toluene, xylene, hexane, ether, tetrahydrofuran, dioxane, chloroform, methylene chloride, ligroin, petroleum ether, petroleum benzine, dimethyl sulfoxide and dimethylformamide. By using such solvents, the above organic silicon compound or polymer may be used as a solution having lower viscosity. The heat-treatment is carried out at a temperature of 800° to 2,500° C., or in vacuum or in an atmosphere of at least one inert gas selected from nitrogen, argon, carbon monoxide and hydrogen. The aforesaid impregnation or coating operation may be repeatedly carried out so long as this operation is possible.

The composite ceramic material of this invention is suitable for use as a structural material as a result of greatly increasing the mechanical shock resistance, mechanical strength and corrosion resistance at high temperatures of ceramics which are inherently weak to mechanical shock and have reduced mechanical strength and corrosion resistance at high temperatures.

It is also suitable for use in a rigorous environment from high to low temperatures. Furthermore, since the composite ceramic material of this invention decreases very little in strength even at sintering temperatures which cannot be used firing temperatures for ceramics, it has the advantage of being able to be used as a reinforcing material for a wide range of ceramics.

In the present invention, the flexural strength is the three-point flexural strength (kg/mm$^2$) at a span of 30 mm which is set forth in JIS R1601-1981.

The following Examples illustrate the present invention more specifically.

The inorganic fibers used in the following examples were produced as follows:

Production of inorganic fibers (I)

A 5-liter three-necked flask was charged with 2.5 liters of anhydrous xylene and 400 g of sodium, and they were heated to the boiling point of xylene under a nitrogen gas stream. One liter of dimethyldichlorosilane was added dropwise over 1 hour. After the addition, the mixture was heated under reflux for 10 hours to form a precipitate. The precipitate was collected by filtration, and washed first with methanol and then with water to give 420 g of polydimethylsilane as a white powder.

Separately, 759 g of diphenyldichlorosilane and 124 g of boric acid were heated in n-butyl ether at 100° to 120° C. in an atmosphere of nitrogen gas. The resulting white resinous material was further heated in vacuum at 400° C. for 1 hour to give 530 g of polyborodiphenylsiloxane.

The polydimethylsilane (250 g) was mixed with 8.27 g of the polyborodiphenylsiloxane, and the mixture was heated to 350° C. for 10 hours in a nitrogen stream in a 2-liter quartz tube equipped with a refluxing tube to give 200 g of polycarbosilane.

The polycarbosilane (80 g) and 8 g of titanium tetraisopropoxide were weighed, and a mixture of these was heated at 340° C. for 3 hours with stirring in an atmosphere of nitrogen gas to obtain polytitanocarbosilane containing silicon and titanium. The resulting polymer was concentrated at 330° C. for 1 hour in a stream of nitrogen to obtain a solid in the form of a block.

The resulting polytitanocarbosilane was melted at 270° C. and spun through a spinneret with an orifice diameter of 300 micrometers, and taken up at a rate of 400 m/min. The fibers were heated under no tension in air from room temperature at a temperature elevating rate of 15° C./hour, and maintained at 170° C. for 1 hour to render them infusible. The infusible fibers were heated under no tension in an ammonia gas stream to 1300° C. over the course of 6.5 hours, and calcined by maintaining them at 1300° C. for 1 hour. There were obtained inorganic fibers (I) composed mainly of silicon, titanium (3% by weight), nitrogen and oxygen and having a diameter of 13 micrometers, a tensile strength of 300 kg/mm$^2$ and a modulus of elasticity of 17 tons/mm$^2$. The resulting inorganic fibers (I) were found to consist of a mixture of an amorphous material composed of Si, Ti, N and O and an aggregate of ultrafine crystalline particles with a particle diameter of not more than 500 Å of $Si_2N_2O$, TiN, $Si_3N_4$ and/or $TiN_{1-x}$ ($0<x<1$) and amorphous $SiO_2$ and $TiO_2$. The inorganic fibers contained 47.9% by weight of Si, 3.0% by weight of Ti, 25.6% by weight of N, and 22.1% by weight of O in terms of elemental composition.

Production of inorganic fibers (II)

Polyzirconocarbosilane was obtained in the same way as in the production of the inorganic fibers (II) except that 10 g of zirconium ethoxide was added to 80 g of polycarbosilane obtained as above. The polymer was spun, rendered infusible and calcined to form inorganic amorphous fibers (II) composed mainly of silicon, zirconium (6.0% by weight), nitrogen and oxygen and having a diameter of 10 micrometers, a tensile strength of 340 kg/mm$^2$ and a modulus of elasticity of 18 tons/mm$^2$. The inorganic fibers (II) contained 46.8% by weight of Si, 6.0% by weight of Zr, 29.4% by weight of N and 16.2% by weight of O in terms of elemental composition.

EXAMPLE 1

Boron carbide (3% by weight) and 10% by weight of polytitanocarbosilane powder were added to and well mixed with a $\beta$-silicon carbide powder having an average particle diameter of 0.2 micrometer. The resulting mixture and the inorganic fibers (I) having a length of 50 mm and a diameter of 10 to 15 micrometers aligned uniformly in one direction were alternately stacked so that the content of the fibers in the assembly was 40% by volume. The resulting assembly was compression-molded under 500 kg/cm$^2$ by a die press. The molded product was heated to 1550° C. at a rate of 200° C./hr in an argon atomosphere, and maintained at this temperature for 1 hour to obtain an inorganic fiber-reinforced silicon carbide composite sintered body.

The flexural strength of the resulting sintered composite material is shown in Table 1 in comparison with the flexural strengths of a silicon carbide fiber-reinforced silicon carbide composite sintered body produced in the same way as above by using silicon carbide fibers obtained from polycarbosilane alone, and a silicon carbide sintered body free from the inorganic fibers and the polytitanocarbosilane powder. The flexural strengths values in the table were measured in a direction at right angles to the fibers.

It is seen from Table 1 that the silicon carbide sintered body reinforced with the inorganic fibers (I) used in this invention shows a flexural strength about 1.5 times at room temperature, and about 2 times at 1400° C., as high as that of the sintered composite material obtained by using the silicon carbide fibers as a reinforcing material. Furthermore, the flexural strength of the sintered composite material reinforced with the inorganic fibers (I) was about 3 times as high as that of the silicon carbide sintered body at room temperature and 1400° C. Thus, the composite material of this invention has excellent characteristics at high temperatures.

TABLE 1

| Material | Flexural strength at room temperature (kg/mm$^2$) | Flexural strength at 1400° C. (kg/mm$^2$) |
| --- | --- | --- |
| Inorganic fiber-reinforced silicon carbide composite sintered body of the invention | 58 | 44 |
| Silicon carbide fiber-reinforced silicon carbide composite sintered body | 38 | 23 |
| Silicon carbide sintered body | 20 | 17 |

EXAMPLE 2

Alumina (2% by weight), 3% by weight of yttria and 3% by weight of aluminum nitride were well mixed with α-silicon nitride powder having an average particle diameter of 0.5 micrometer. The mixture and about 10% by volume of the inorganic fibers (II) having a length of 50 mm and a diameter of 10 to 15 micrometers and aligned uniformely in one direction were alternately stacked. The inorganic fibers were stacked multiaxially (in the 0° and 90° directions). The assembly was maintained at 1750° C. and 30 kg/cm$^2$ for 30 minutes by using a hot-press to obtain an inorganic fiber-reinforced silicon nitride composite sintered body.

By a similar method, a silicon nitride sintered body free from the inorganic fibers was produced.

The flexural strengths of these sintered bodies at room temperature and 1300° C. were compared. The results are shown in Table 2.

It is seen from Table 2 that at room temperature, the sintered composite material of this invention showed an increase of about 20% in flexural strength, and that at 1300° C., the silicon nitride sintered body shows an abrupt decrease in flexural strength, while the inorganic fiber-reinforced silicon nitride composite material of this invention retains high strength sufficient for its use as a high-temperature structural material.

TABLE 2

| Material | Flexural strength at room temperature (kg/mm$^2$) | Flexural strength at 1300° C. (kg/mm$^2$) |
|---|---|---|
| Inorganic fiber-reinforced silicon nitride composite sintered body | 110 | 60 |
| Silicon nitride sintered body | 93 | 35 |

EXAMPLE 3

Calcium oxide (10% by weight) was added to an aluminum nitride powder having an average particle diameter of 0.2 micrometer. The mixture was well mixed with a xylene solution of 15% by weight of polyzirconocarbosilane (the weight ratio of polyzirconocarbosilane to xylene was 1). Xylene was then evaporated to render the mixture flaky. The mixture was passed through a 325-mesh filter to adjust its particle size distribution. The resulting mixture and 30% by volume of a plain-weave fabric (6 warps×6 wefts per cm; one yarn consisted of 500 filaments) were stacked alternately. The assembly was maintained at 1800° C. and 200 kg/cm$^2$ for 1 hour by a hot-press to obtain an inorganic fiber-reinforced aluminum nitride composite sintered body.

A sintered body of aluminum nitride alone was produced in the same way as above except that polyzirconocarbosilane and inorganic fibers (I) were not used.

An aluminum nitride sintered body was produced in the same way as above except that a plain-weave fabric of alumina fibers was used instead of the plain-weave fabric of the inorganic fibers (I).

The inorganic fiber-reinforced aluminum nitride composite sintered body obtained in this Example had a flexural strength of 50 kg/mm$^2$ at room temperature, while the aluminum nitride composite sintered body had a flexural strength at room temperature of 28 kg/mm$^2$.

EXAMPLE 4

Chopped fibers obtained by cutting the inorganic fibers (II) to a length of 10 mm were added in an amount of 45% by volume to a powder of borosilicate glass (7740) made by Corning Glass Co. (average particle diameter 44 micrometers), and they were dispersed well in isopropanol. The slurry was applied to the aforesaid inorganic fibers aligned uniformely in one direction and a plurality of such slurry-applied inorganic fibers were stacked. The assembly was dried and then maintained at 1300° C. and 750 kg/cm$^2$ for about 10 minutes in an argon atmosphere by a hot press device to obtain an inorganic fiber-reinforced glass composite material.

The resulting composite material had a flexural strength at room temperature of 18.5 kg/mm$^2$. Composite glass ceramics obtained by using silicon carbide fibers from polycarbosilane under the same conditions as above had a flexural strength at room temperature of 14.2 kg/mm$^2$.

EXAMPLE 5

Titanium oxide (2% by weight) was mixed with alumina having an average particle diameter of 0.5 micrometer, and the mixture was well mixed in an alumina ball mill with 15% by volume of organic metal polymer fibers [precursor of the inorganic fibers (I)]. The precursor fibers had an average length of about 0.5 mm. The mixture was sintered at 2000° C. by a hot press.

A sintered body obtained by the same procedure as above except that the precursor fibers were not used and the resulting inorganic fiber-reinforced alumina sintered body of this invention were subjected to a spalling test. A flat plate sample (40×10×3 mm) was put in a furnace kept at 1500° C., rapidly heated for 20 minutes, then taken out, and forcibly cooled with air for 20 minutes. The sample was then examined for the occurrence of cracks.

The composite material of this invention developed cracks after subjecting it to the spalling test through 9 cycles, while the alumina sintered body not reinforced with the inorganic fibers developed cracks only after two cycles. Thus, the composite material of this invention showed a spalling resistance more than 4 times as high as that of the latter.

EXAMPLE 6

The inorganic fiber-reinforced silicon carbide composite sintered body obtained in Example 1 was immersed under a reduced pressure of about 1×10$^{-1}$ mmHg in a solution of 1 part by weight of polytitanocarbosilane in 0.3 part by weight of xylene, and then placed under a pressure of 100 kg/cm$^2$ to impregnate the solution. The impregnated sintered body was heat-treated in an argon atmosphere at 1550° C. for 1 hour. The foregoing operation was carried out three times in total. The resulting sintered body had an apparent density of 3.10 g/cm$^3$ increased from its original apparent density before immersion of 2.88 g/cm$^3$. The sintered body had a flexural strength increased to 62 kg/mm$^2$ at room temperature.

What is claimed is:

1. An inorganic fiber-reinforced ceramic composite material comprising a matrix of a ceramic and inorganic fibers as a reinforcing material, characterized in that
    (a) the inorganic fibers are inorgnic fibers containing silicon, either titanium or zirconium, nitrogen and oxygen and being composed of (i) an amorphous material consisting substantially of Si, M, N and O, or (ii) an aggregate consisting substantially of ultrafine crystalline particles with a particle diameter of not more than 500 Å of $Si_2N_2O$, MN, $Si_3N_4$ and/or $MN_{1-x}$, and amorphous $SiO_2$ and $MO_2$, provided that in the above formulae, M represents titanium or zirconium, and x is a number represented by $0 < x < 1$, or (iii) a mixture of the amorphous material (i) and the aggregate (ii), and (b) the ceramic is at least one material selected from the group consisting of carbides, nitrides, oxides, glass ceramics, graphite and inorganic materials containing silicon, either titanium or zirconium, nitrogen and oxygen and composed of (i) an amorphous material consisting substantially of Si, M, N and O, or (ii) an aggregate consisting substantially of ultrafine crystalline particles with a particle diameter of not more than 500 Å of $Si_2N_2O$, MN, $Si_3N_4$ and/or $MN_{1-x}$ and amorphous $SiO_2$ and $MO_2$, provided that in the above formulae, M represents titanium or zirconium, and x is a number represented by $0 < x < 1$, or (iii) a mixture of the amorphous material (i) and the aggregate (ii).

2. The composite material of claim 1 wherein the inorganic fibers are monoaxially oriented.

3. The composite material of claim 1 wherein the inorganic fibers are multiaxially oriented.

4. The composite material of claim 1 wherein the inorganic fibers are in the form of a fabric selected from fabrics of the plain, satin, imitation gauze and twill weaves.

5. The composite material of claim 1 wherein the inorganic fibers are in the form of a helically woven fabric or a three-dimensionally woven fabric.

6. The composite material of claim 1 wherein the inorganic fibers are chopped short fibers.

7. The composite material of claim 1 wherein the inorganic fibers consist of 30 to 60% by weight of Si, 0.5 to 35% by weight of either Ti or Zr, 10 to 40% by weight of N and 0.01 to 30% by weight of O.

8. The composite material of claim 1 wherein the proportion of the inorganic fibers is about 10 to about 70% by volume.

* * * * *